United States Patent [19]

Lau et al.

[11] Patent Number: 5,995,984
[45] Date of Patent: Nov. 30, 1999

[54] APPARATUS AND METHOD FOR ZOOM-IN ENTRY OF AN ELEMENT IN A TABLE

[75] Inventors: Frankie Lau, Pleasanton; Bangalore D. Madhuchandra, Milpitas; Nandita Gupta, Santa Clara; Theresa Brown, Milpitas; Nagendra Nagarajayya, Sunnyvale; Ling Chen, Milpitas; Lani Stalun, Redwood City; Ashok Gourishety; Sarma Ballamudi, both of Milpitas, all of Calif.

[73] Assignee: Sun Microsystem Inc., Palo Alto, Calif.

[21] Appl. No.: 08/678,446

[22] Filed: Jul. 3, 1996

[51] Int. Cl.⁶ ........................................... G06F 7/00
[52] U.S. Cl. ..................... 707/505; 707/507; 345/333
[58] Field of Search ................... 707/503, 504, 707/505, 506, 507, 509, 510, 102, 104; 345/333, 334, 339, 340, 341

[56] References Cited

U.S. PATENT DOCUMENTS

| | | | |
|---|---|---|---|
| 5,230,063 | 7/1993 | Hoeber et al. | 345/354 |
| 5,247,611 | 9/1993 | Norden-Paul et al. | 707/504 |
| 5,333,252 | 7/1994 | Brewer, III et al. | 707/506 |
| 5,450,545 | 9/1995 | Martin et al. | 395/701 |
| 5,471,575 | 11/1995 | Giansante | 707/503 |
| 5,561,793 | 10/1996 | Bennett et al. | 707/201 |
| 5,640,577 | 6/1997 | Scharmer | 707/507 |
| 5,668,961 | 9/1997 | Healy et al. | 345/339 |
| 5,701,400 | 12/1997 | Amado | 395/76 |
| 5,701,499 | 12/1997 | Capson et al. | 707/503 |

OTHER PUBLICATIONS

*Microsoft® Project for Windows Feature Guide*, Version 1.0, Microsoft Corporation, 1990, pp. 12–25 and 114.

*Primary Examiner*—Stephen S. Hong
*Attorney, Agent, or Firm*—Skjerven, Morrill, MacPherson, Franklin & Friel L.L.P.; Ken J. Koestner

[57] ABSTRACT

A graphic screen including data in a table format is displayed in a window. The window implements a Zoom-In function using a Zoom-In display element. A user "Zooms-In" to any row in the table by selecting a row and activating the Zoom-In display element. While displaying the same window, activation of the Zoom-In display element hides the table and displays detailed information in a form format for updating the selected row of the table. The table is hidden and the form format is presented until the user activates a "Zoom-Out" display element, terminating the detailed information form format display and leaving the table display exposed. In the form format, the user performs functions including modifying data relating to a table entry, saving the modified or entered data, proceeding to the next row item, or regressing to the previous row.

24 Claims, 11 Drawing Sheets

Part Screen — 302

500
304

| File | Edit | Options | View | | | | Help |

318  320  322  328   324        306   330   332   326

Product ID: [    ]   Product Name: [              ]   Prod Info 512   514        516            518           520
☐ Delete   [Previous   [Next Row]   [Zoom   [Zoom
  Row       Row]                    Cancel]   Out]

Sys Config Maintenance
510

**Mfg. Part Number: [        ]   ☐ NA

Mfg. Part Num Repl. By: [      ]   ☐ NA

**Description: [              ]

Part Availability Date: [    ]

*Estimated Std Cost: [      ]

Actual Std. Cost: [      ]

*Estimated List Price: [      ]

Actual List Price: [      ]

*ECO/ECR Number: [      ]   ☐ NA

Comments: [                    ]

☐ Mfg./Mktg. Link

508

| Delete | Mfg Part Num |
| ☐ | [     ] |
| ☐ | [     ] |

Sys Config Specifications

*Est MTEP: [    ]   *MTTR: [    ]   *MTTI: [    ]

*AV Voltage: [      ]   *Power Reqs: [      ]   ☐ NA

Loading Currently selected row of Sys Config Maint into "Zoom In" Form.    509

Part Screen — 302

600
304

| File | Edit | Options | View | | Help |

318  320  322  328  324                    306  330  332  326

Product ID: [      ]    Product Name: [                    ]    Prod Info 512        516          518         520
☐ Delete 514  Previous    Next Row    Zoom      Zoom
  Row         Row                     Cancel    Out

| **Mfg Part Num: | [      ] |                     510       |
| *Est MTEF:      | [      ] | *AC Voltage:     | [      ]   |
| MTEF:           | [      ] | AC Frequency:    | [      ]   |
| *MTTR:          | [      ] | *Power Reqs:     | [      ] ☐NA |
| *MTTI:          | [      ] | Humidity Range:  | [      ] ☐NA |
| MTBSC:          | [      ] | Temp Range:      | [      ] ☐NA |
| MTBPR:          | [      ] | BTU's Per Hour:  | [      ] ☐NA |
| Fail Rate:      | [      ] | Minimum Altitude:| [      ] ☐NA |
| Height:         | [      ] | Maximum Altitude:| [      ] ☐NA |
| Width:          | [      ] | EMI Emission Level:| [    ] ☐NA |
| Depth:          | [      ] | Noise Level:     | [      ] ☐NA |
| Weight:         | [      ] | Compliance:      | [      ]   |
| Comments:       | [                                    ]  |

508

Loading Currently selected row of SysSpec Maint into "Zoom In" Form.    509

APPARATUS AND METHOD FOR ZOOM-IN ENTRY OF AN ELEMENT IN A TABLE

BACKGROUND OF THE INVENTION

1. Reservation of Copyright

A claim of copyright protection is made on portions of the description in this patent document. The copyright owner has no objection to the facsimile reproduction by anyone of the patent document or the patent disclosure, as it appears in the Patent and Trademark Office patent file or records, but reserves all other rights.

2. Field of the Invention

The present invention relates to a graphical user interface (GUI) operative on a workstation or computer system. More specifically, the present invention relates to a GUI system and method for entering or updating an element of a table.

DESCRIPTION OF THE RELATED ART

Present-day computerized business systems typically include a number of computers or workstations connected in a network configuration and tied to a database. One of the tasks of the computerized business system is to supply information from the database to multiple system users so that the users can organize information from the database into a useful form. A substantial amount of planning is necessary to successfully market a product. Information from the database supplies the foundation for this planning. Planning has become highly efficient through the usage of computerized systems for arranging database information in a useful format. Various procedures and techniques have continually improved the efficiency of planning.

Computer display systems have been developed to represent data to a user and facilitate understanding of the data through graphic representations of the data. Many types of data representations have been developed including text and numbers, graphs and pictorial views. The development of data representations has been facilitated through the usage of object-oriented user interfaces which define display objects, called icons, for symbolically defining display characteristics of a graphic element on a display screen. The usage and definition of icons replaces the usage of a large number of program code commands and greatly reduces the length of graphic display programs and the complexity of graphic program coding. The development of data representations has also been facilitated through the definition and usage of "windows" which are displayed concurrently with other windows on a display screen. A graphic window typically includes a plurality of objects which may overlap one another within the window screen. A user may call for the display of a window, cancel the display of a window, redefine the information illustrated in a window, delete information from a window, copy or move data from one window to another and the like. The user operates on a window in the manner that a worker operates on a file folder in an office. The user may operate on the window contents and manipulate the window contents and the window, as if the image in the window were an actual object.

One type of useful data format is a tabular format in which various related data structures are displayed in columns and rows. Tables are advantageously used to compactly display large amounts of information in the limited space of a display screen. The data in a table may be entered, modified or deleted by selecting an element within the table array and editing the information within the selected element. However, often the tabular format does not convey sufficient information to allow a user to understand what data is appropriate for the table entry since only a few columns can be accommodated in the visible region of the screen. Accordingly, a "form" format is advantageously used to present a greater amount of detailed information than is possible using a table format. A user can update either the table or the detailed form.

Unfortunately, if a screen which is separate from the table screen is used to display the detailed form several problems arise. First, data inconsistencies occur if a user updates both the table screen and the form screen simultaneously, since both windows are active in the system simultaneously. Second, the detailed form does not automatically display all portions of the screen that are selected in the table when the detailed window is open. Third, for a screen with multiple information type groups, multiple separate windows are displayed, causing confusion about which window corresponds to a particular portion of the table. Fourth, only one window should exist for a particular information type.

What is needed is an apparatus and technique for displaying a table and a detailed form relating to table entries that does not allow inconsistent definition of a particular data entry.

SUMMARY OF THE INVENTION

In accordance with the present invention, a graphic screen including data in a table format is displayed in a window. The window implements a Zoom-In function using a Zoom-In button function. A user "Zooms-In" to any row in the table by selecting a row and activating the Zoom-In button function. While displaying the same window, activation of the Zoom-In button function hides the table and displays detailed information in a form format for updating the selected row of the table. The table is hidden and the form format is presented until the user activates a "Zoom-Out" button function, terminating the detailed information form format display and leaving the table display exposed. In the form format, the user performs functions including modifying data relating to a table entry, saving the modified or entered data, proceeding to the next row item, or regressing to the previous row.

Many advantages are achieved by the described method and apparatus. One advantage is that only a single window is displayed so that the data entered in the form and data entered in the table are written to the same data structures, thereby preventing inconsistencies in the data. A further advantage is that a plurality of information types are displayed in the same window preventing confusion relating to which window is open.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

DETAILED DESCRIPTION OF THE PREFERRED EMBODIMENTS

Figure 1:
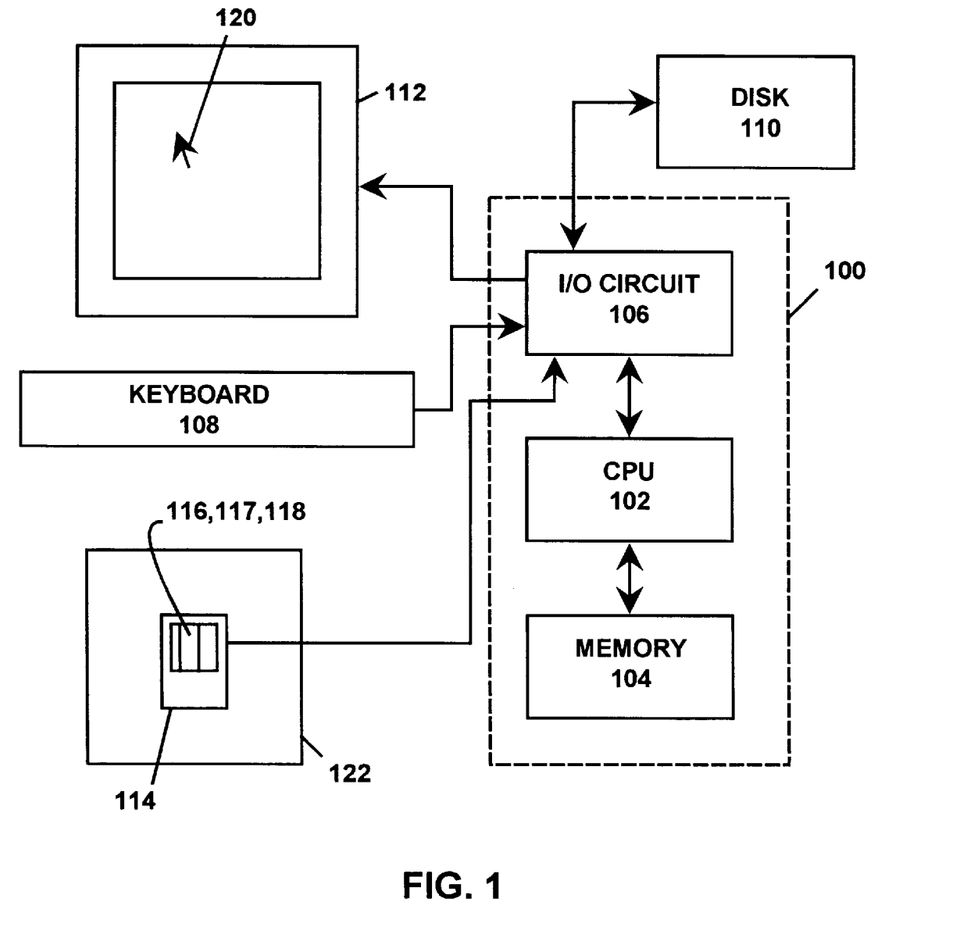
FIG. 1 is a block diagram which depicts a workstation or computer system hardware upon which is implemented a graphical user interface for navigating a database in accordance with one embodiment of the present invention.

Referring to FIG. 1, a block diagram shows an example of a computer system 100, such as a personal computer, a desktop computer, a laptop computer, a workstation and the like, which operates a graphical user interface (GUI). The computer system 100 includes a central processing unit (processor) 102 connected to a primary storage 104, and an input/output (I/O) circuit 106. In one embodiment, the computer system 100 is a computer such as a Sun Microsystems workstation running a Solaris™ operating system version 2.4 or higher where Sun, Sun Microsystems, Solaris, and the Sun Logo are trademarks or registered trademarks of Sun Microsystems, Inc. in the United States and other countries. The processor 102 may include a plurality of processors. The primary storage 104 supplies storage for program code that is run on the processor 102 and data utilized in conjunction with the program code. The primary storage 104 is embodied in various forms including dynamic RAM, static RAM, various types of read-only memory, flash memories and the like. The I/O circuit 106 communicates information between the processor 102 and other devices in the computer system 100 including a input device 108, a secondary storage 110, a graphic display monitor 112, and a cursor control device 114, all of which are connected to the processor 102 via the I/O circuit 106. The input device 108 receives commands and inputs data from a user and communicates the commands and input data to the processor 102. The secondary storage 110 supplies storage, such as long-term storage of program code and data to the computer system 100. The secondary storage 110 may be embodied in various devices such as magnetic disk drives, hard disk drives, floppy disk drives, CD ROM drives, magnetic tape drives, cassette drives and the like. The graphic display monitor 112 displays images generated by the computer system 100. The cursor control device 114 is used in conjunction with a graphic display such as the graphic display monitor 112 and is manipulated by the user to select various command modes, input data, and position a cursor on a desired location of the graphic display monitor 112. The list of devices connected to the I/O circuit 106 is nonexclusive and may be extended in various embodiment to include a myriad of devices such as magnetic tape players and recorders, CD ROM players and recorders, printers, interface controllers (SCSI, PCI and others), network controllers and the like.

The cursor control device 114 is most typically a "mouse" but may also take the form of trackballs, joysticks, thumbwheels, and other manipulation devices. The cursor control device 114 includes a plurality of switches 116, 117 and 118. The cursor control device 114 is manipulated by the user to position a cursor 120 at a desired location on the graphic display monitor 112 by movement of the cursor control device 114 over a surface 122. The cursor control device 114 generally uses an optical method for signaling the processor 102 of position changes of the cursor 120 by movement of the cursor control device 114 over a grid on the surface 122.

Figure 2:
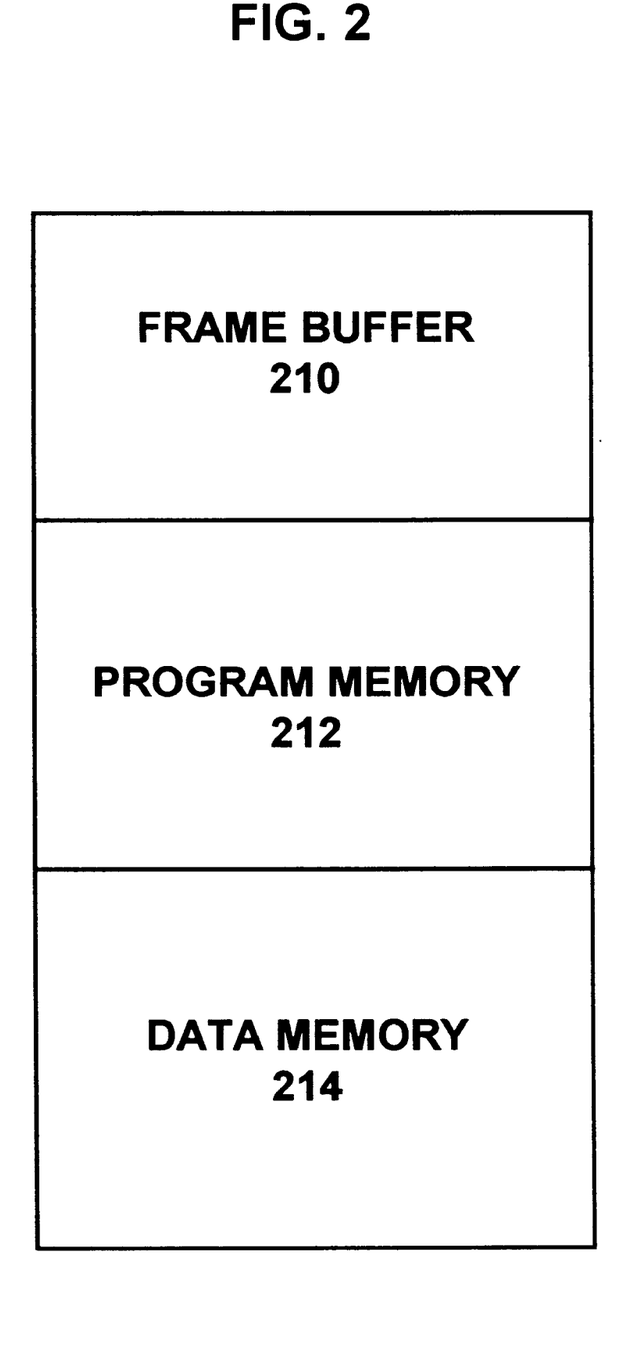
FIG. 2 is a primary storage map illustrating an arrangement of primary storage for usage in the computer system shown in FIG. 1.

Referring to FIG. 2, a primary storage map illustrates an arrangement of primary storage 104 for usage in the computer system 100. The primary storage 104 is arranged having a frame buffer 210, a program storage 212 and a data storage 214. This arrangement of the primary storage 104 is illustrative of a simple, useful configuration. Actual configurations will depend on the many programs and data structures that a user may use on the computer system 100. The a frame buffer 210 corresponds to a bitmap of the graphic display monitor 112 and represents the video storage of the graphic display monitor 112 so that each storage location of the a frame buffer 210 corresponds to a pixel on the graphic display monitor 112. In this manner, the a frame buffer 210 is a two dimensional array of points having known coordinates which correspond to pixels of the graphic display monitor 112. Most simply, the a frame buffer 210 is a continuous block in the primary storage 104 allocated so that each storage location is mapped onto a corresponding pixel on the graphic display monitor 112. The program storage 212 includes program code for a variety of programs operating on the processor 102 including graphic display programs, control programs, and calculation programs, for example. The data storage 214 includes data structures for usage by the operating programs contained in the program storage 212.

Figure 3A:
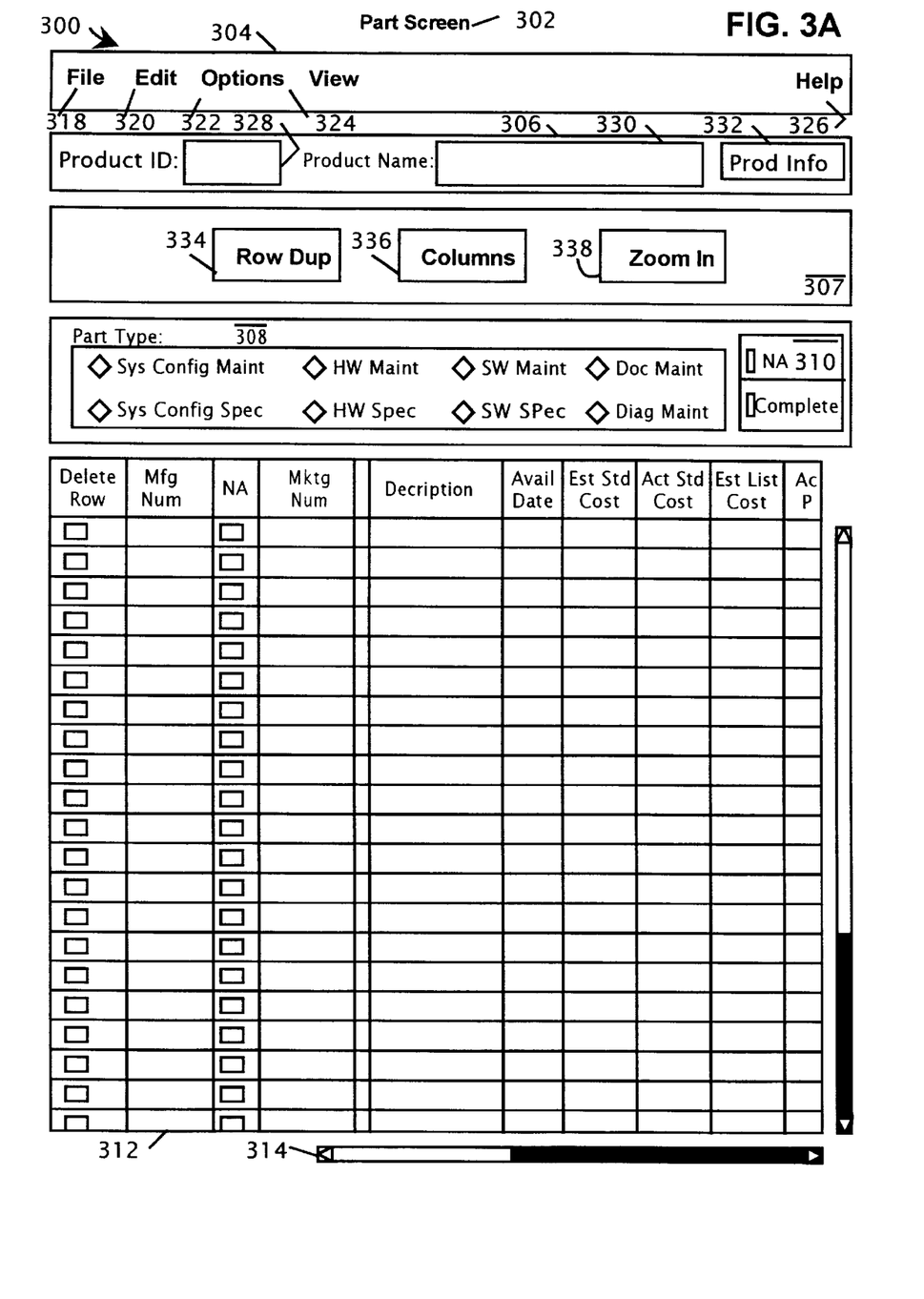
FIGS. 3A and 3B illustrate a schematic block diagram and a corresponding pictorial example of a screen presentation which show the contents of a screen implementing a Zoom-In function.
Figure 3B:
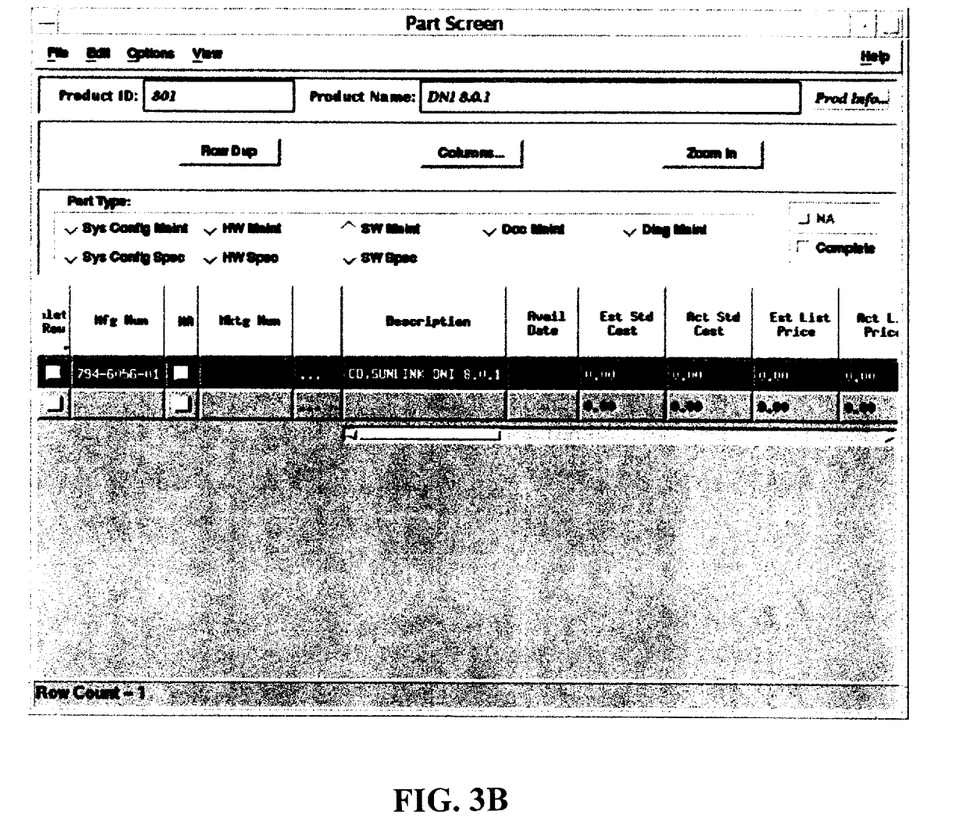

The computer system 100 commonly display a plurality of "windows" on the graphic display monitor 112, which may be displayed over the entire face of the graphic display monitor 112 or in only a portion of the graphic display monitor 112. A window is typically defined as a portion of a display surface in which display images pertaining to a particular application can be presented. Different applications can be displayed simultaneously in different windows. A representative window commonly includes multiple forms of data in the form of graphics, text and symbols. Referring to FIGS. 3A and 3B, a schematic block diagram and a corresponding pictorial example of a screen presentation show the contents of a screen implementing a Zoom-In function. In this example, the screen is a Parts Screen for displaying "Parts" data of a product in a "Table" format. However, the Zoom-In function is applicable for many other types of display screens and generally is applicable to any display screens that display information in a table format. The screen is termed an "invoking" screen 300 to make reference to the usage of the invoking screen 300 to activate the Zoom-In function while both the invoking screen 300 and an invoked screen remain in the same window. The invoking screen 300 includes a title field 302, a control field 304, a name field 306, a command field 307, a type field 308, a status box 310, a table 312, and a horizontal scroll bar 314.

The title field 302 is a text display showing the title of the invoking screen 300, in the present example, "Part Screen".

The control field 304 displays a plurality of button stacks including a File button stack 318, an Edit button stack 320, an Options button stack 322, a View button stack 324, and a Help button stack 326. A button function is a button for actuating a single function or for executing a single command on the processor 102. A button stack is used to display a group of commands in a logical set on a menu which is displayed when the button stack is selected by the user. The button stacks of the control field 304 are shown displayed in a horizontal arrangement, although the button stacks may alternatively be displayed in other arrangements such as a vertical arrangement or an arrangement of multiple rows and columns. A user activates a button stack, including the File button stack 318, the Edit button stack 320, the Options button stack 322, the View button stack 324, and the Help button stack 326 by manipulating the cursor control device 114 and activating a switch on the cursor control device 114, causing the processor 102 to generate and display a menu (not shown) below the corresponding button stack. The menu includes a plurality of single button functions which may be selected by the user by placing the cursor 120 over the selected single button function and actuating a selected switch of the switches 116, 117 or 118, causing the immediate execution of the selected command by the processor 102.

The name field 306 displays text identifying a selected row in the table 312. In particular, the name field 306 displays an identifier field 328 and a selected name field 330. In the illustrative example, the identifier field 328 corresponds to a "Product ID" and the a selected name field 330 corresponds to a "Product Name" of a product selected from a row in the table 312. The name field 306 also includes an information function button 332 which is actuated by the user to command the display of a predetermined information screen. The user activates the columns button 336 to display a list of all columns in the table 312 for all types displayed in the table 312. The user activates the Zoom-In button 338 to activate the Zoom-In function.

The command field 307 allows the user to perform a command which operates in some manner to change the invoking screen 300. In the illustrative example, the command field 307 includes three button functions including a row duplication button 334, a columns button 336 and a Zoom-In button 338. The user activates the row duplication button 334 to duplicate a row in the table 312. In particular, the user selects a row in the table 312 by placing the cursor 120 over a selected row and actuating a switch of switches 116, 117 and 118. The user then actuates the row duplication button 334, causing the selected row to be duplicated in the table 312.

The type field 308 lists different types of items that are listed in the table 312. A particular list of table entries corresponds to each of the types so that selection of a particular type causes the table entries corresponding to the selected type to be displayed in the table 312. The column description is determined for each of the types. In the illustrative example, the type field 308 lists various product types of the products listed in the table 312. The type field 308 includes a plurality of selection buttons 340, each of which is labeled by text. The user selects a selection button 340 by placing the cursor 120 over the selection button 340 and actuating a switch of switches 116, 117 and 118, causing the table 312 to list entries of the selected type. In the illustrative example, the part types include a system configuration maintenance type, a system configuration specification type, a hardware maintenance type, a hardware specification type, a software maintenance type, a software specification type, a document maintenance type, and a diagnostic maintenance type.

The status box 310 displays the status of the table 312 for the selected table type. The current status is shown by illumination of a status indicator corresponding to a status class. In the illustrative example, the status classes include a complete class indicating that the list of table entries has been designated as complete, and a not available (NA) class indicative that no entries are available for a particular class.

The table 312 is a table of information entries arranged in rows with the information entries including a plurality of information items that are shown in columns. The user places the cursor 120 over a selected row and activates a switch of switches 116, 117 and 118 to select a particular information entry. In the illustrative example, the information entries correspond to particular products. A first column is a "delete row" column which is a button function for commanding the deletion of a row. The user places the cursor 120 over the delete row button function of a selected row and activates a switch of switches 116, 117 and 118 to delete the row from the table 312. The user may update or change a selected row in a selected column by placing the cursor 120 over a particular row and column entry and entering replacement data using the input device 108. Data may alternatively be entered or replaced in the table 312 by evoking a Form-type display of the selected entry using the Zoom-In function button 338.

Figure 4A:
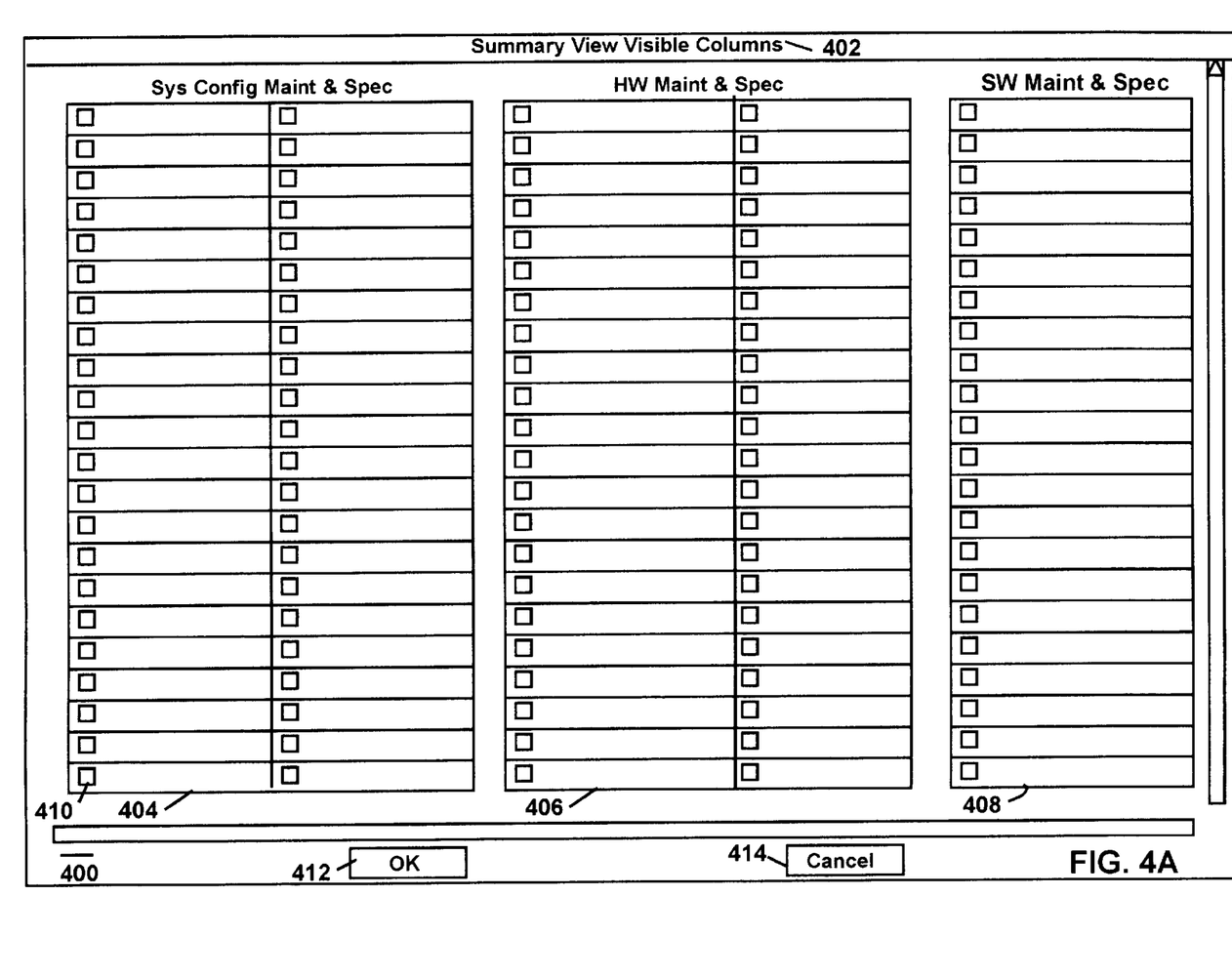
FIGS. 4A and 4B illustrate a schematic block diagram and a corresponding pictorial example of a screen presentation which show the contents of a column list display screen invoked through the screen shown in FIGS. 3A and 3B.
Figure 4B:
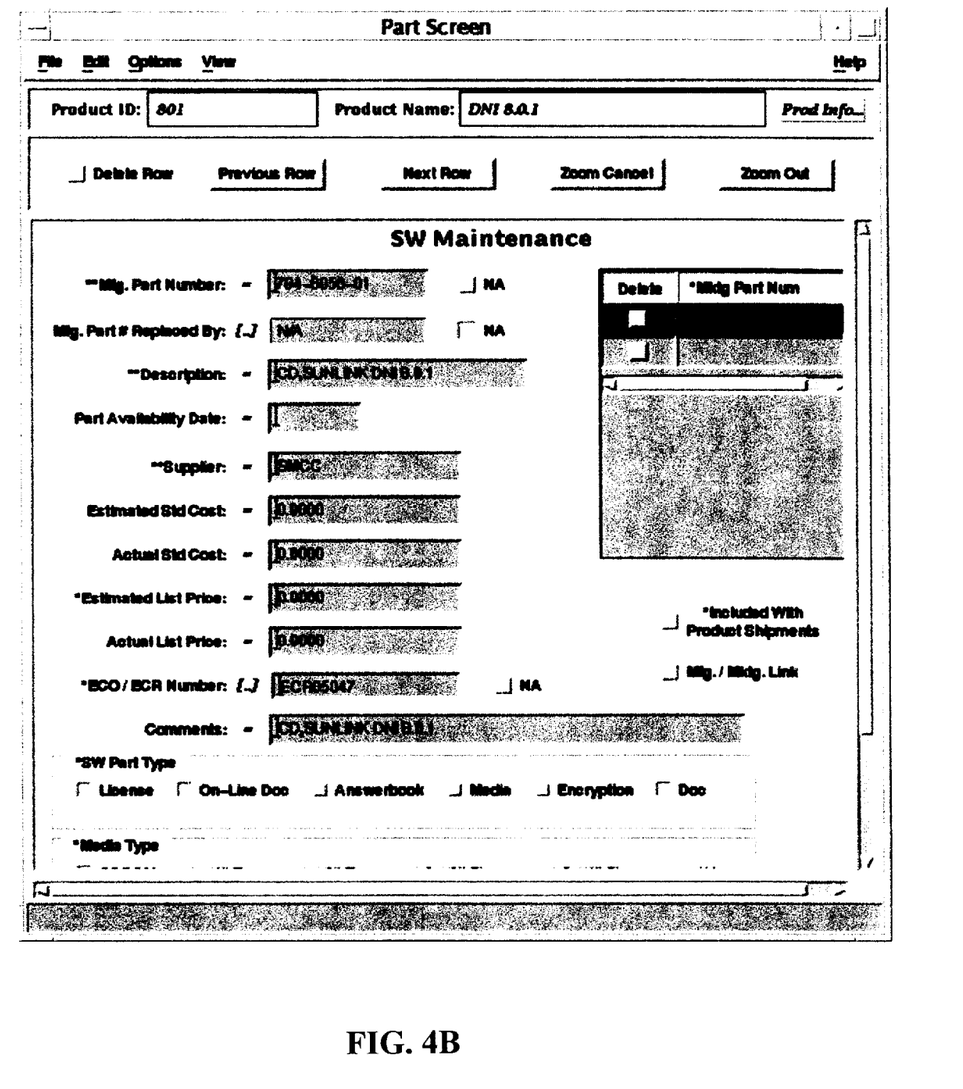

The illustrative example of the invoking screen 300 is a system configuration maintenance screen for a product list which includes columns including the delete row column, a manufacturing number column, a "not available" column, a marketing number column, a description column, an available date column, cost columns including an estimated cost and an actual cost, price columns including an estimated cost and an actual cost, and other columns. A complete list of columns is accessed by selecting the columns button 336 of the command field 307. An example of a columns screen 400 is shown in FIGS. 4A and 4B. The user invokes the columns screen 400 to select the columns to be displayed in the table 312 of the invoking screen 300. Upon activating the columns button 336, the same window is displayed but a plurality of fields of the invoking screen 300 are hidden by the columns screen 400 display. Specifically, the entire invoking screen 300 is hidden including the title field 302, the control field 304, the name field 306, the command field 307, the type field 308, the status box 310, the table 312, and the horizontal scroll bar 314 are hidden and the columns screen 400 is displayed.

The columns screen 400 includes a title field 402 and a plurality of selection buttons for selecting a particular column heading for display which may be organized into groups. In the illustrative example, a several of the different types of items are combined into groups that include the same column headings. For example, groupings are made including one group 404 of the system configuration maintenance type and the system configuration specification type, a second group 406 of the hardware maintenance type and the hardware specification type, and a third group 408 of the software maintenance type and the software specification type. These groupings are made on the basis of similarity or equivalence of the column types for particular groups. Each of the column identifiers includes a selection button 410 for designating whether a particular column of the plurality of columns is to be made visible in the invoking screen 300. The columns screen 400 has two button functions including an accept button function 412 for accepting the selection of designated visible columns and a cancel button function 414 for returning from the columns screen 400 to the invoking screen 300 without changing the selection of visible columns.

Referring again to FIGS. 3A and 3B, the horizontal scroll bar 314 is an image with arrows 316 on two sides which permits the text and graphics within the table 312 to be scrolled in the direction in which the horizontal scroll bar 314 is pulled. In particular, the horizontal scroll bar 314 is moved by placing the cursor 120 over one of the arrows 316 of the horizontal scroll bar 314 and activated a selected switch 116, 117 or 118 on the cursor control device 114, or alternatively, by placing the cursor 120 on the horizontal scroll bar 314, depressing a preselected switch 116, 117 or 118 on the cursor control device 114 and moving the cursor control device 114 in the direction the table 312 is to be scrolled. The horizontal scroll bar 314 is useful for displaying all columns of the table 312 particularly in a case, such as the illustrative case, in which the number of columns is too large to be displayed in a single screen width.

Figure 5A:
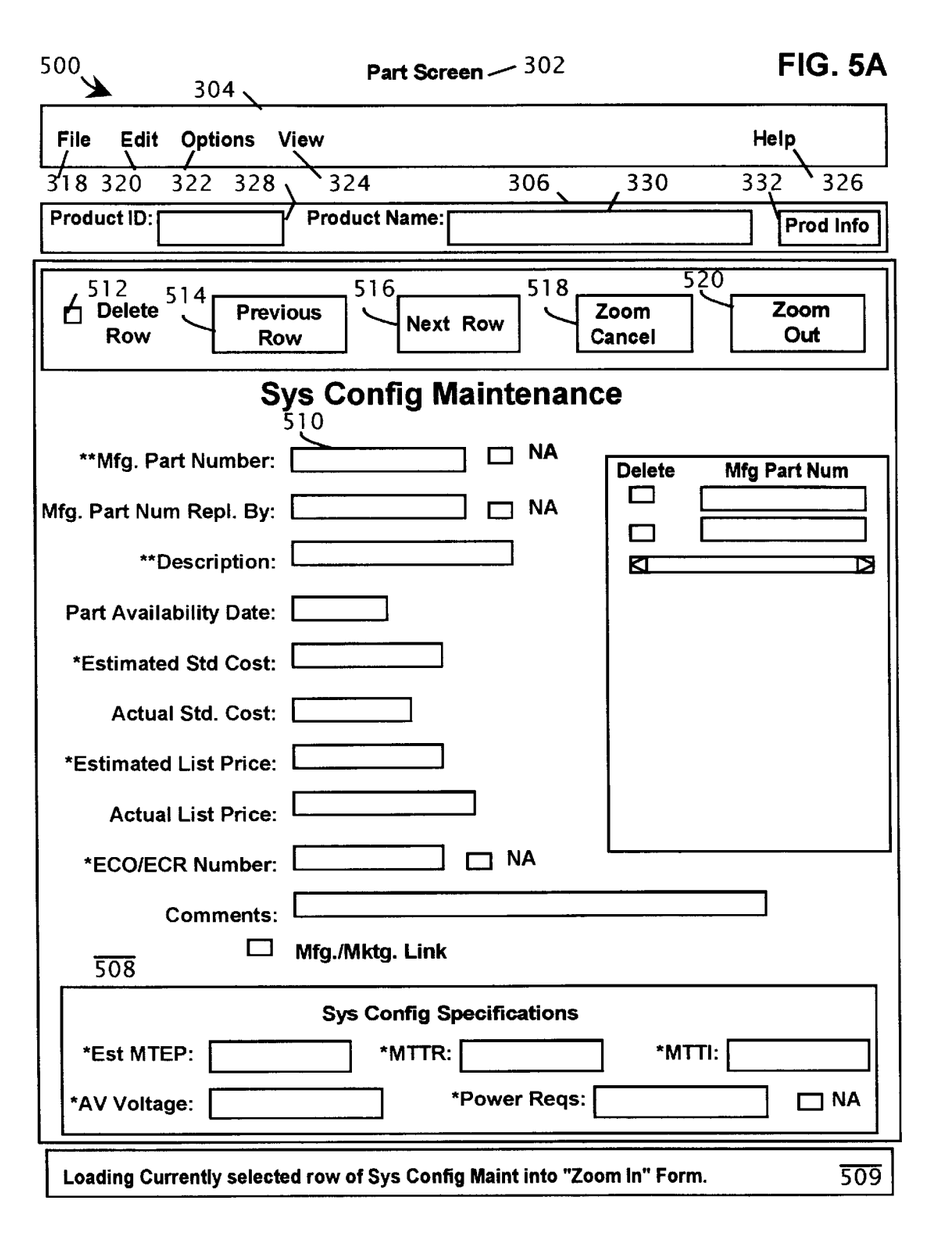
FIGS. 5A and 5B illustrate a schematic block diagram and a corresponding pictorial example of a screen presentation which show the contents of a Zoom-In screen which is evoked by the selection of a Zoom-In button function.
Figure 5B:
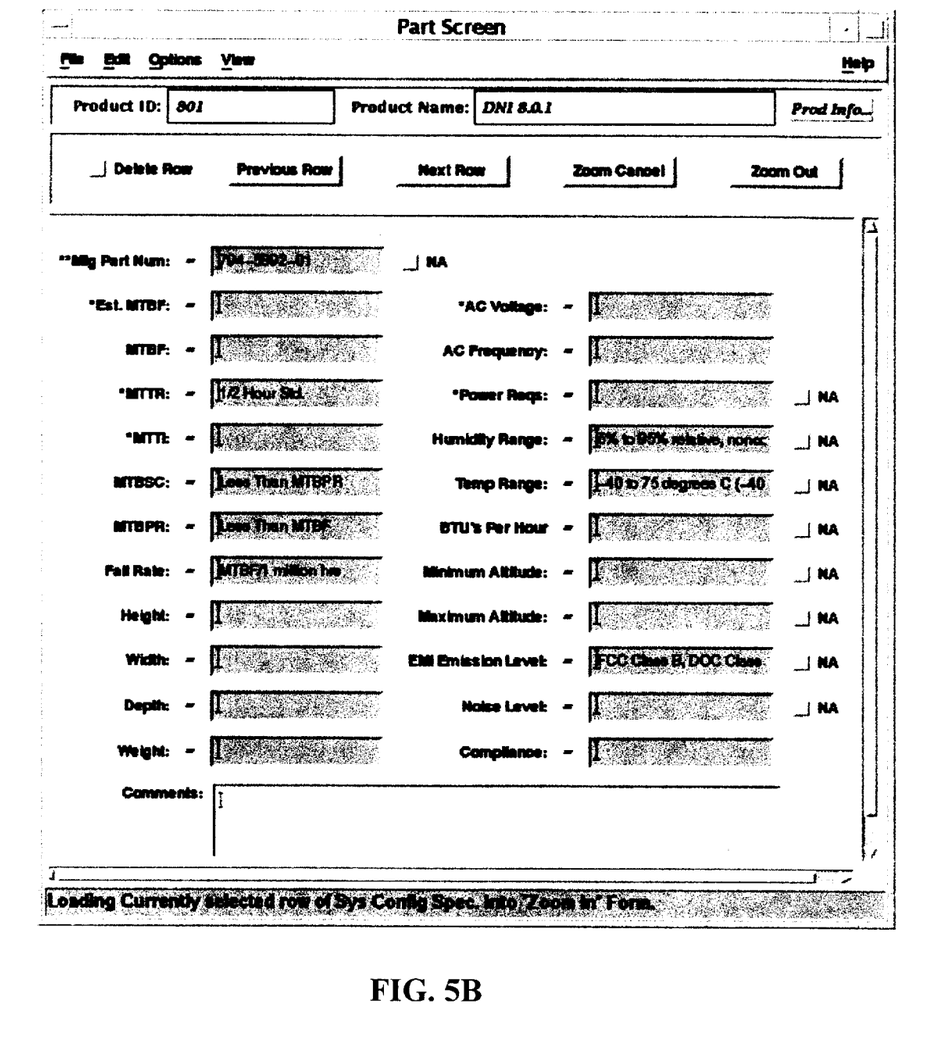

Referring to FIGS. 5A and 5B, a schematic block diagram and a corresponding pictorial example of a screen presentation show the contents of a Zoom-In screen 500 which is evoked by the selection of a Zoom-In button function he invoking screen 300. Specifically, the Zoom-In screen 500 is evoked from the invoking screen 300 by selecting a row in the table 312 by placing the cursor 120 over the row and activating a switch of switches 116, 117 and 118. Upon activating the Zoom-In button 338, the same window is displayed but a plurality of fields of the invoking screen 300 are hidden by the Zoom-In screen 500 display. Specifically, portions of the entire invoking screen 300 are displayed including the title field 302, the control field 304, and the name field 306. Other portions of the invoking screen 300 are hidden including the command field 307, the type field 308, the status box 310, the table 312, and the horizontal scroll bar 314 and new portions of the Zoom-In screen 500 are displayed. The Zoom-In screen 500 displays a Form-type presentation for entering information relating to a particular entry or row of the table 312 of the invoking screen 300. The Form format includes a plurality of entry boxes 510 for entering text information corresponding to the selected row of the table 312 in the invoking screen 300. All information in the Zoom-In screen 500 relates to a particular selected row of the table 312 in the invoking screen 300. An entry box of the plurality of entry boxes 510 is entered to define information in a column or columns in the table 312 in the invoking screen 300. In particular, information entered into an entry box may be placed in one or more columns of the table 312 or may be used to derive information in a column of the table 312.

In the illustrative example, the Zoom-In screen 500 is a Parts Screen for displaying information relating to a particular product in a "Form" format. However, the Zoom-In function is applicable for many other types of display screens and generally is applicable to any display screens that are invoked by a first screen and display information in a form format for accepting data to fill a table in a table format in the first screen. The Zoom-In screen 500 is termed an "invoked" screen making reference to the usage of the invoking screen 300 to activate the Zoom-In function in the invoked Zoom-In screen 500. The Zoom-In screen 500 includes the title field 302, the control field 304, and the name field 306 which are retained from the invoking screen 300. The Zoom-In screen 500 hides the remainder of the invoking screen 300 with a new command field 507, a form field 508, and a descriptive text field 509.

The command field 507 is operated by the user to perform a command operating to modify the data designated by the Zoom-In screen 500 or to control the screen presentation of the Zoom-In screen 500. In the illustrative example, the command field 507 has five button functions including delete row button 512, a previous row button 514, a next row button 516, a Zoom-Cancel button 518, and a Zoom-Out button 520.

The user activates the delete row button 512 to remove a row from the table 312. In particular, the user selects the delete row button 512 by placing the cursor 120 over the delete row button 512 and actuating a switch of switches 116, 117 and 118, causing the entry to be invalidated in the primary storage 104, removing the row from display in the table 312, and displaying the next row in the table 312 by changing the Zoom-In screen 500 so that the information in the form field 508 is replaced by the information relating to the next sequential row in the table 312 of the invoking screen 300 shown in FIGS. 3A and 3B.

The user activates the previous row button 514 by placing the cursor 120 over the previous row button 514 and actuating a switch of switches 116, 117 and 118, causing the display of the immediately previous row in the table 312 by changing the Zoom-In screen 500 so that the information in the form field 508 is replaced by the information relating to the immediately previous row in the table 312 of the invoking screen 300.

The user activates next row button 516 by placing the cursor 120 over the next row button 516 and actuating a switch of switches 116, 117 and 118, causing the display of the next sequential row in the table 312 by changing the Zoom-In screen 500 so that the information in the form field 508 is replaced by the information relating to the next sequential row in the table 312 of the invoking screen 300.

The user activates the Zoom-Cancel button 518 by placing the cursor 120 over the Zoom-Cancel button 518 and actuating a switch of switches 116, 117 and 118, canceling any changes made to the information during a current accessing of the Zoom-In screen 500 and returning the display to the invoking screen 300.

The user activates the Zoom-Out button 520 by placing the cursor 120 over the Zoom-Out button 520 and actuating a switch of switches 116, 117 and 118, accepting and making permanent any changes made to the information during a current accessing of the Zoom-In screen 500 and returning the display to the invoking screen 300.

The user modifies entries in the form field 508 by placing the cursor 120 over an entry box of the plurality of entry boxes 510 and entering desired data in the form of text and numbers into the entry box, typically using entry via the input device 108. In the illustrative example, the user has accessed a product of the system configuration maintenance type using the invoking screen 300 and activated the Zoom-In button 338 to display the illustrative Zoom-In screen 500. The entry boxes 510 generally correspond to the columns defined under the system configuration maintenance type in the columns screen 400 shown in FIGS. 4A and 4B although information entered into an entry box may be placed in one or more columns of the table 312 or may be used to derive information in one or more columns of the table 312. The form field 508 may include one or more selection buttons 511 in addition to entry boxes 510 to enter TRUE/FALSE type information as well as text information and numbers.

The descriptive text field 509 describes to the user the operation that is performed during accessing of the Zoom-In button 338. In the illustrative example, the operation performed is the loading of a currently selected row of a system maintenance configuration type into a form accessed using the Zoom-In function.

Figure 6A:
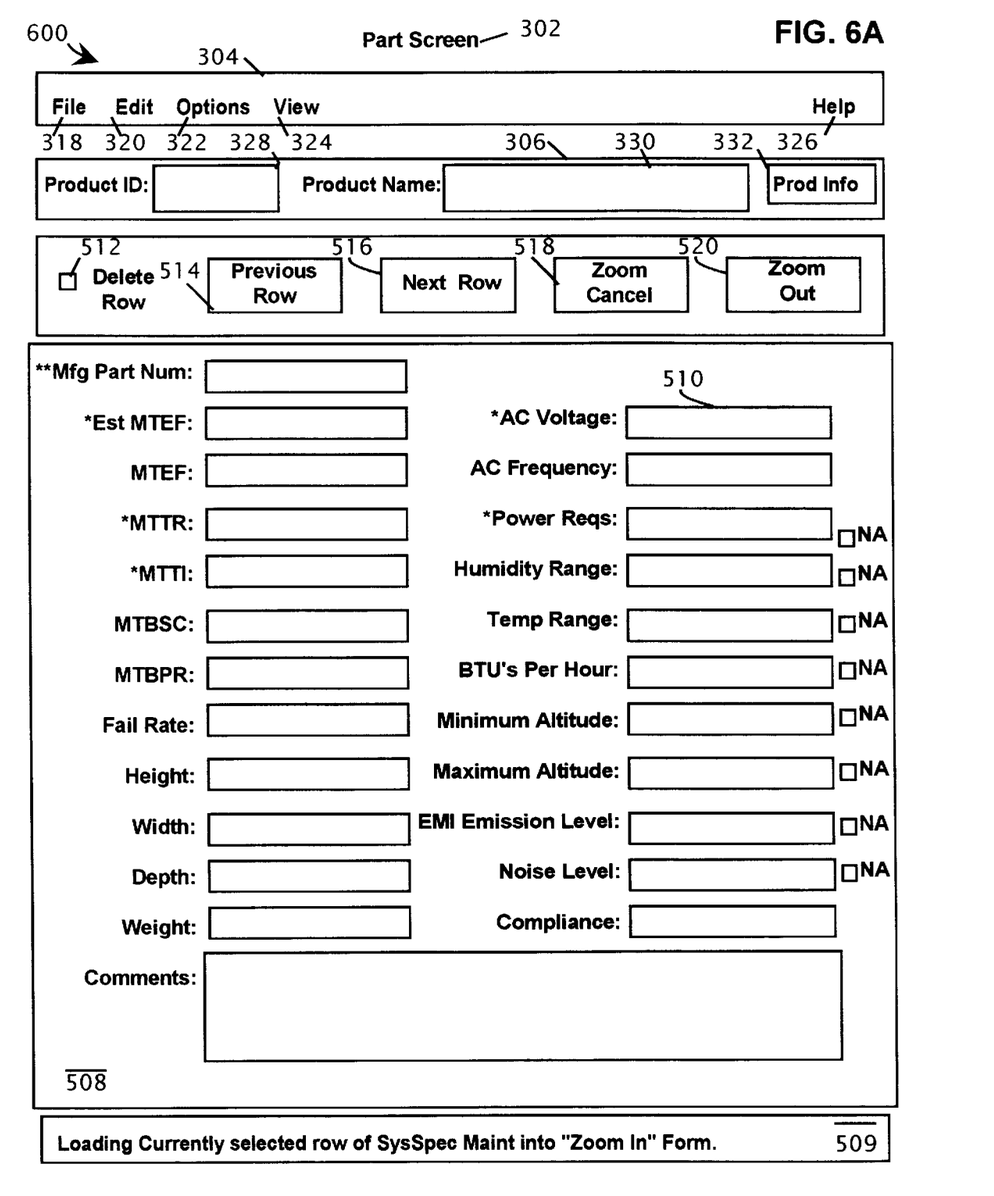
FIGS. 6A and 6B illustrate a second example of a schematic block diagram and a corresponding pictorial example of a screen presentation which show the contents of a Zoom-In screen which is evoked by the selection of a Zoom-In button function.
Figure 6B:
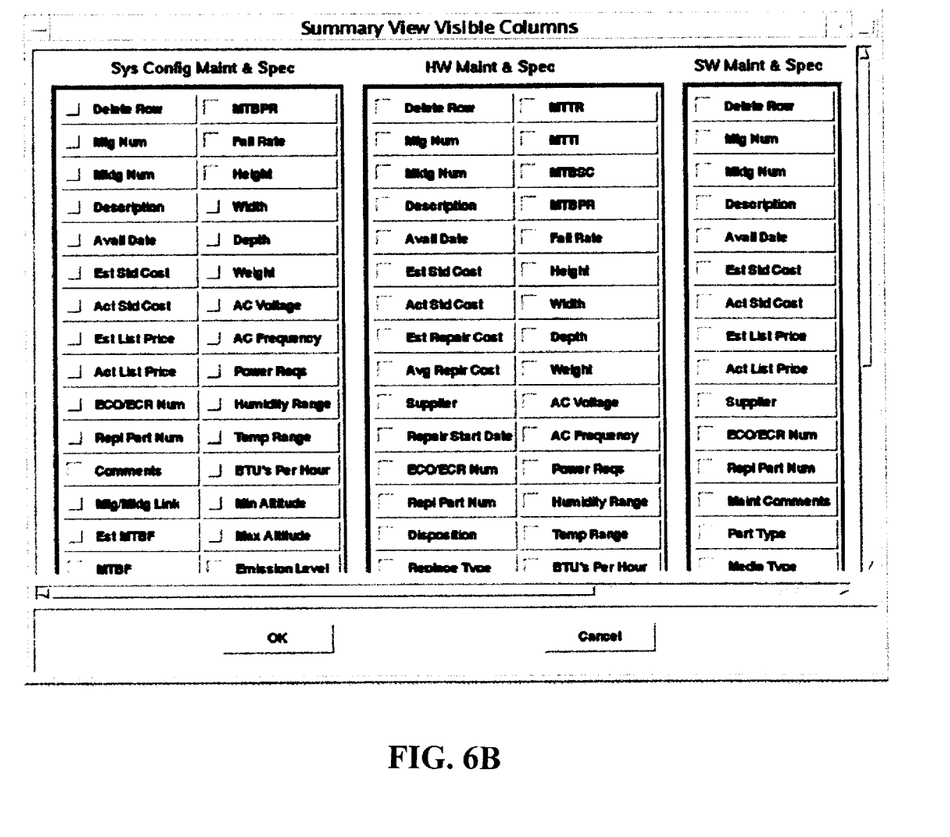

FIGS. 6A and 6B illustrate an example of a Zoom-In screen 600 which is similar to the Zoom-In screen 500 shown in FIGS. 5A and 5B, but refer to parts of the system configuration specification type rather than the system configuration maintenance type. The Zoom-In screen 600 includes specification-type entry boxes 610.

In an illustrative embodiment, the computer system 100 is implemented using a standard Motif interface in which Motif library functions are implemented according to *OSF/ Motif style Guide*, Version 1.0. 1989. Cambridge, Mass.: Open Software. The Motif interface is used for performing most display functions including display widgets. A widget is an interface element such as a menu, a scroll bar, or a push button. In addition, the computer system 100 uses the X Window System (Scheifler R. and Gettys J., *ACM Transactions on Graphics*, V63, 1986) including the Xlib graphics library for multiple purposes including the drawing of status lines, error lines, background and text.

Figure 7:
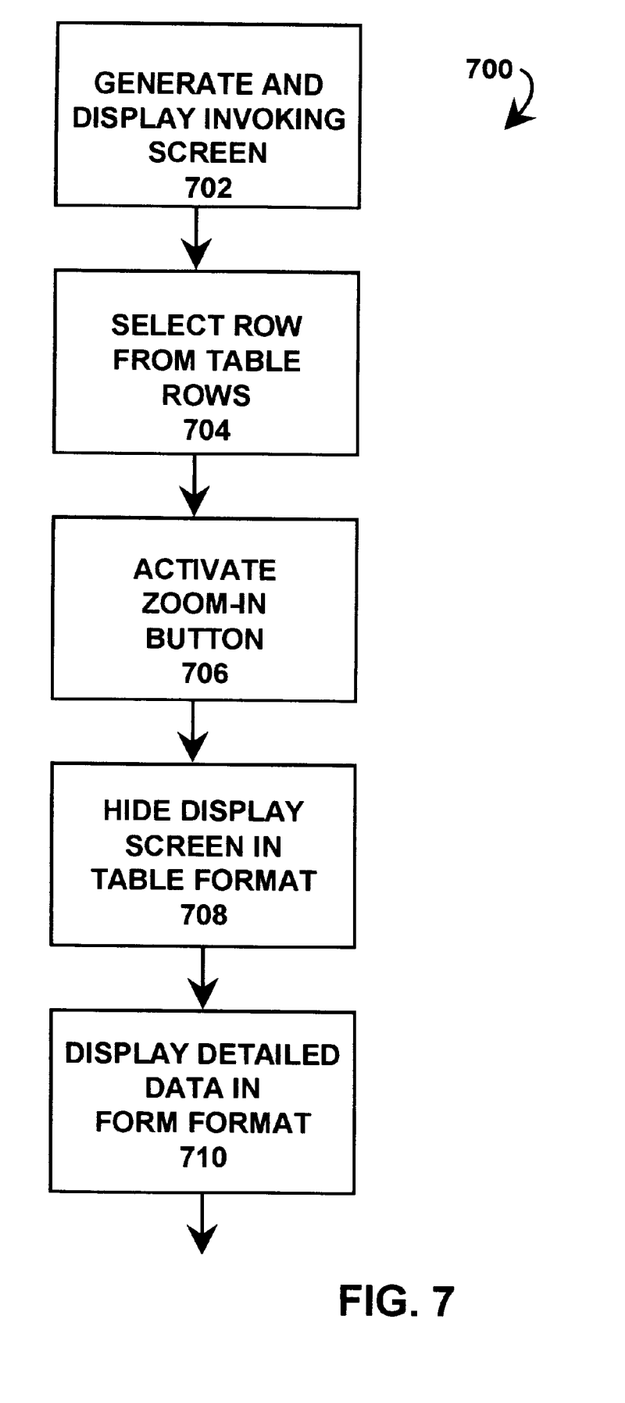
FIG. 7 is a flow chart which illustrates the operation of the Zoom-In function.

Referring to FIG. 7 in accordance with FIGS. 1, 3A and 3B, a flow chart illustrates a method 700 for controlling a graphic display of a computer system such as the computer system 100. The processor 102 generates and displays the invoking screen 300 in a window in step 702. The invoking screen 300 includes the Zoom-In button 338 and the table 312 for displaying data stored in the primary storage 104 in a tabular format including a plurality of data elements addressed in a plurality of rows columns. The processor 102 receives signals from the cursor control device 114 and controls the operation the cursor 120 in accordance with these signals to enable the user to select a particular row of the plurality of rows in the table 312 in step 704. Similarly, the processor 102 receives signals from the switches 116, 117 and 118 of the cursor control device 114 to enable the user to activate the Zoom-In button 338 in step 706. In this manner, a user "zooms in" to any row of the table 312 and selects, or clicks, the Zoom-In button 338 to access the data in the defined row. With respect to the illustrative embodiment, the "Parts List" display includes a plurality of parts, each part defining a row of the table 312. Each part has a plurality of attributes, which are displayed as columns of the rows shown in the table 312. The user selects a particular part by manipulating the cursor control device 114 so that the cursor 120 overlies a selected row. The user operates a switch on the cursor control device 114 to select the row.

In response to the activation of the Zoom-In button 338, the processor 102 "hides" the table 312 showing the data display in the tabular format in step 708 and, in step 710, displays a data in a detailed "form" format shown as the Zoom-In screen 500, including the form field 508 and the delete row button 512, the previous row button 514, the next row button 516, the Zoom-Cancel button 518, and the Zoom-Out button 520 shown in FIGS. 5A and 5B. Although the table 312 is hidden, the processor 102 continues to operate from the same window, accessing the same data structures. In this manner, when a data element of the display in the form field 508 is altered, the corresponding element in the display of the table 312 is altered simultaneously.

While the invention has been described with reference to various embodiments, it will be understood that these embodiments are illustrative and that the scope of the invention is not limited to them. Many variations, modifications, additions and improvements of the embodiments described are possible. For example, the embodiments are described as systems which utilize Xlib and Motif to implement the product navigation system. In other embodiments, other graphics libraries and systems may be used or the computer system may be constructed without using a graphics library.

What is claimed is:

1. A method for controlling a graphic display of a computer system including a processor, the graphic display coupled to the processor, and a data storage coupled to the processor, the method comprising:

generating and displaying a display screen in a window to assist an interactive exchange with a user, the display screen including:
  a table for displaying data stored in the data storage in a tabular format including a plurality of data elements addressed in a plurality of lines of a first dimension and in a plurality of elements in a second dimension; and
  an icon area for displaying a plurality of display icons including a zoom-in icon for activating a zoom display element, a columns icon for displaying a list of columns in the table, and a row duplication icon for duplicating a row in the table;
providing for a selection of a line of the plurality of lines in the first dimension;
providing for activation of the zoom display element;
in response to the activation of the zoom display element:
  receiving a request to zoom;
  in response to the request, completely hiding the tabular form data display and providing that the tabular form data display cannot be activated until zoom is exited;
  displaying a visual image in the window including a form for displaying detailed information relating to the selected line of the plurality of lines in the first dimension including: an icon area for displaying a plurality of display icons including a zoom-out icon for activating the zoom-out display element, a previous row icon for activating a previous row display element, a next row icon for activating a next row display element, a zoom cancel icon for activating a zoom-cancel display element, and a delete row icon for activating a delete row display element;
  providing for entering and modifying of elements in the second dimension; and
  modifying display data in the form format data display and corresponding data in the data storage in response to the entering and modification of elements in the second dimension.

2. A method according to claim 1, wherein the zoom display element is a zoom button function.

3. A method according to claim 1, wherein the step of generating and displaying the display screen in the window including a form includes displaying the zoom-out display element, the method further comprising:
  providing for activation of the zoom-out display element; and
  responsive to activation of the zoom-out display element:
    modifying data in the data storage in accordance with the entered and modified elements so that the hidden tabular format data display and the form format data display are updated simultaneously;
    canceling the form format display; and
    restoring the hidden tabular form data display.

4. A method according to claim 3, wherein the zoom-out display element is a zoom-out button function.

5. A method according to claim 1, wherein the step of generating and displaying the display screen in the window including a form includes displaying the zoom-cancel display element, the method further comprising:
  providing for activation of the zoom-cancel display element; and
  responsive to activation of the zoom-cancel display element:
    canceling the form format display; and
    restoring the hidden tabular form data display.

6. A method according to claim 5, wherein the zoom-cancel display element is a zoom-cancel button function.

7. A method according to claim 1, wherein the step of generating and displaying the display screen in the window including a form includes displaying the previous row display element, the method further comprising:

providing for activation of the previous row display element; and responsive to activation of the previous row display element:

generating and displaying the display screen in the window including a form for displaying data stored in the data storage in a form format for requesting detailed information relating to the line previous to the selected line of the plurality of lines in the first dimension, the information relating to elements in the second dimension.

8. A method according to claim 1, wherein the step of generating and displaying the display screen in the window including a form includes displaying the next row display element, the method further comprising:

providing for activation of the next row display element; and responsive to activation of the next row display element: generating and displaying the display screen in the window including a form for displaying data stored in the data storage in a form format for requesting detailed information relating to the line next to the selected line of the plurality of lines in the first dimension, the information relating to elements in the second dimension.

9. A method according to claim 1, wherein the step of providing for a selection of a line further comprises:

generating and displaying a cursor;

responding to movement of a cursor control device coupled to the processor by moving the cursor on the display screen;

determining the location of the cursor with respect to the line on the display screen; and responding to activation of a switch of the cursor control device when the cursor is in a predetermined position with respect to the line by selecting the line.

10. A method according to claim 1, wherein the step of providing for activation of the zoom display element further comprises:

generating and displaying a cursor;

responding to movement of a cursor control device coupled to the processor by moving the cursor on the display screen;

determining the location of the cursor with respect to the zoom display element on the display screen; and responding to activation of a switch of the cursor control device when the cursor is in a predetermined position with respect to the zoom display element by activating a zoom display element signal.

11. A method according to claim 1, wherein the step of providing for entering and modifying of elements in the second dimension further comprises:

generating and displaying a cursor;

responding to movement of a cursor control device coupled to the processor by moving the cursor on the display screen; and determining the location of the cursor with respect to an entry box on the display screen;

responding to activation of a switch of the cursor control device when the cursor is in a predetermined position with respect to the entry box by making the entry box receptive to an input device signal; and receiving element data in accordance with the input device signal.

12. A method according to claim 1, wherein the generating and displaying the display screen in the window including a form includes displaying the delete row display element, the method further comprising:

providing for activation of the delete row display element; and responsive to activation of the delete row display element;

removing from the tabular form data display the selected line of the plurality of lines in the first dimension.

13. A method according to claim 1, wherein the generating and displaying the display screen in the window including a form includes displaying the next row display element, the method further comprising:

providing for activation of the next row display element; and responsive to activation of the next row display element;

removing from the tabular form data display the selected line of the plurality of lines in the first dimension; and generating and displaying the display screen in the window including a form for displaying data stored in the data storage in a form format for requesting detailed information relating to the line next to the selected line of the plurality of lines in the first dimension, the information relating to elements in the second dimension.

14. A graphic display computer system, the system comprising:

a processor, a graphics display coupled to the processor, a data storage coupled to the processor, a cursor control device coupled to the processor, and a graphical user interface (GUI) software program including:

a routine for generating and displaying a display screen in a window to assist an interactive exchange with a user, the display screen including:

a table for displaying data stored in the data storage in a tabular format including a first plurality of data elements addressed in a plurality of lines of a first dimension and in a second plurality of elements in a second dimension; and an icon area for displaying a plurality of display icons including a zoom-in icon for activating a zoom display element, a columns icon for displaying a list of columns in the table, and a row duplication icon for duplicating a row in the table;

a cursor control device driver routine and a graphics display driver routine providing for selection of a line of the plurality of lines in the first dimension, and providing for activation of the zoom display element; and a routine responsive to the activation of the zoom display element including:

a routine for completely hiding the tabular form data display and providing that the tabular form data display cannot be activated until zoom is exited;

a routine for generating and displaying the display screen in the window including a form for displaying data stored in the data storage in a form format for requesting detailed information relating to the selected line of the plurality of lines in the first dimension, the information relating to elements in the second dimension, the form including:
an icon area for displaying a plurality of display icons including:
a zoom-out icon for activating a zoom-out display element;
a previous row icon for activating a previous row display element;
a next row icon for activating a next row display element;
a zoom cancel icon for activating a zoom-cancel display element canceling the zoom display; and
a delete row icon for activating a delete row display element deleting a row in the table;
a cursor control device driver routine, an input device driver routine and graphics display driver routine providing for entering and modifying of elements in the second dimension; and
a routine for modifying display data in the form format data display and corresponding data in the data storage in response to the entering and modification of elements in the second dimension.

15. A system according to claim 14, wherein the routine for generating and displaying the display screen in the window including a form includes a routine for displaying the zoom-out display element, comprising:
a cursor control device driver routine and a graphics display driver routine providing for activation of the zoom-out display element; and
a routine responsive to activation of the zoom-out display element including:
a routine for modifying data in the data storage in accordance with the entered and modified elements so that the hidden tabular format data display and the form format data display are updated simultaneously;
a routine for canceling the form format display; and
a routine for restoring the hidden tabular form data display.

16. A system according to claim 14, wherein the cursor control device driver routine and a graphics display driver routine for providing for a selection of a line further comprises:
a routine for generating and displaying a cursor;
a routine responsive to movement of a cursor control device coupled to the processor by moving the cursor on the display screen;
a routine for determining the location of the cursor with respect to the line on the display screen; and
a routine responsive to activation of a switch of the cursor control device when the cursor is in a predetermined position with respect to the line by selecting the line.

17. A system according to claim 14, wherein the cursor control device driver routine and a graphics display driver routine for providing for activation of the zoom display element further comprises:
a routine for generating and displaying a cursor;
a routine responsive to movement of a cursor control device coupled to the processor by moving the cursor on the display screen;
a routine for determining the location of the cursor with respect to the zoom display element on the display screen; and
a routine responsive to activation of a switch of the cursor control device when the cursor is in a predetermined position with respect to the zoom display element by activating a zoom display element signal.

18. A system according to claim 14, wherein the cursor control device driver routine and a graphics display driver routine for providing for entering and modifying of elements in the second dimension further comprises:
a routine for generating and displaying a cursor;
a routine responsive to movement of a cursor control device coupled to the processor by moving the cursor on the display screen;
a routine for determining the location of the cursor with respect to an entry box on the display screen;
a routine responsive to activation of a switch of the cursor control device when the cursor is in a predetermined position with respect to the entry box by making the entry box receptive to an input device signal; and
a routine for receiving element data in accordance with the input device signal.

19. A system according to claim 14, wherein the routine for generating and displaying the display screen in the window including a form includes a routine for displaying the previous row display element, comprising:
a routine providing for activation of the previous row display element; and
a routine responsive to activation of the previous row display element including:
a routine for generating and displaying the display screen in the window including a form for displaying data stored in the data storage in a form format for requesting detailed information relating to the line previous to the selected line of the plurality of lines in the first dimension, the information relating to elements in the second dimension.

20. A system according to claim 14, wherein the routine for generating and displaying the display screen in the window including a form includes a routine for displaying a displaying the next row display element, comprising:
a routine providing for activation of the next row display element; and
a routine responsive to activation of the next row display element including:
a routine for generating and displaying the display screen in the window including a form for displaying data stored in the data storage in a form format for requesting detailed information relating to the line next to the selected line of the plurality of lines in the first dimension, the information relating to elements in the second dimension.

21. A method of providing a graphic display computer system, the method comprising:
providing a processor, a graphics display coupled to the processor, a data storage coupled to the processor, a cursor control device coupled to the processor,
and a graphical user interface (GUI) software program including:
a routine for generating and displaying a display screen in a window to assist an interactive exchange with a user, the display screen including:
a table for displaying data stored in the data storage in a tabular format including a plurality of data elements addressed in a plurality of lines of a first dimension and in a plurality of elements in a second dimension; and
an icon area for displaying a plurality of display icons including a zoom-in icon for activating a zoom display element, a columns icon for displaying a list of columns in the table, and a row duplication icon for duplicating a row in the table;

a cursor control device driver routine and a graphics display driver routine providing for selection of a line of the plurality of lines in the first dimension, and providing for activation of the zoom display element; and a routine responsive to the activation of the zoom display element including:
- a routine for completely hiding the tabular form data display and providing that the tabular form data display cannot be activated until zoom is;
- a routine for generating and displaying the display screen in the window including a form for displaying data stored in the data storage in a form format for requesting detailed information relating to the selected line of the plurality of lines in the first dimension, the information relating to elements in the second dimension, the form including:
  - an icon area for displaying a plurality of display icons including:
    - a zoom-out icon for activating a zoom-out display element;
    - a previous row icon for displaying a previous row in the table;
    - a next row icon for activating a next row display element displaying a next row in the table;
    - a zoom cancel icon activating a zoom-cancel display element; and
    - a delete row icon for deleting a row in the table;
- a cursor control device driver routine, an input device driver routine and graphics display driver routine providing for entering and modifying of elements in the second dimension; and
- a routine for modifying display data in the form format data display and corresponding data in the data storage in response to the entering and modification of elements in the second dimension.

22. A method according to claim 21, wherein the routine for generating and displaying the display screen in the window including a form includes a routine for displaying the zoom-out display element, comprising:

a cursor control device driver routine and a graphics display driver routine providing for activation of the zoom-out display element; and a routine responsive to activation of the zoom-out display element including:
- a routine for modifying data in the data storage in accordance with the entered and modified elements so that the hidden tabular format data display and the form format data display are updated simultaneously;
- a routine for canceling the form format display; and
- a routine for restoring the hidden tabular form data display.

23. A method according to claim 21, wherein the routine for generating and displaying the display screen in the window including a form includes a routine for displaying a displaying the next row display element, comprising:

a routine providing for activation of the next row display element; and a routine responsive to activation of the next row display element including:
- a routine for generating and displaying the display screen in the window including a form for displaying data stored in the data storage in a form format for requesting detailed information relating to the line next to the selected line of the plurality of lines in the first dimension, the information relating to elements in the second dimension.

24. An article of manufacture comprising:

a non-volatile storage;

a plurality of instructional sections stored in the non-volatile storage, the instructional sections providing a graphical user interface (GUI) application executable on a computer system, the GUI application comprising:

a routine for generating and displaying a display screen in a window, the display screen including:
- a table for displaying data stored in the data storage in a tabular format including a plurality of data elements addressed in a plurality of lines of a first dimension and in a plurality of elements in a second dimension; and
- an icon area for displaying a plurality of display icons including a zoom-in icon for activating a zoom display element, a columns icon for displaying a list of columns in the table, and a row duplication icon for duplicating a row in the table:

a cursor control device driver routine and a graphics display driver routine providing for selection of a line of the plurality of lines in the first dimension, and providing for activation of the zoom display element; and a routine responsive to the activation of the zoom display element including:
- a routine for completely hiding the tabular form data display and providing that the tabular form data display cannot be activated until zoom is exited;
- a routine for generating and displaying the display screen in the window including a form for displaying data stored in the data storage in a form format for requesting detailed information relating to the selected line of the plurality of lines in the first dimension, the information relating to elements in the second dimension, the form including:
  - an icon area for displaying a plurality of display icons including a zoom-out icon for activating a zoom-out display element;
  - a previous row icon for displaying a previous row in the table;
  - a next row icon; a zoom cancel icon for canceling the zoom display; and
  - a delete row icon for deleting a row in the table;
- a cursor control device driver routine, an input device driver routine and graphics display driver routine providing for entering and modifying of elements in the second dimension; and
- a routine for modifying display data in the form format data display and corresponding data in the data storage in response to the entering and modification of elements in the second dimension.

* * * * *